United States Patent
Broemmelsiek (10) Patent No.: US 7,307,652 B2
(45) Date of Patent: Dec. 11, 2007

(54) METHOD AND APPARATUS FOR OBJECT TRACKING AND DETECTION

(75) Inventor: Raymond M. Broemmelsiek, San Diego, CA (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 348 days.

(21) Appl. No.: 09/801,484

(22) Filed: Mar. 7, 2001

(65) Prior Publication Data

US 2001/0035907 A1    Nov. 1, 2001

Related U.S. Application Data

(60) Provisional application No. 60/188,171, filed on Mar. 10, 2000.

(51) Int. Cl.
*H04N 5/225* (2006.01)
*G06K 9/00* (2006.01)

(52) U.S. Cl. ............................ 348/169; 382/103
(58) Field of Classification Search ................ 348/169, 348/157, 155; 382/243, 190, 107, 103; 375/240.08
See application file for complete search history.

(56) References Cited

U.S. PATENT DOCUMENTS

| | | | |
|---|---|---|---|
| 5,329,368 A | 7/1994 | Plotke | 348/701 |
| 5,387,768 A | 2/1995 | Izard et al. | 187/392 |
| 5,434,621 A | 7/1995 | Yu | 348/347 |
| 5,473,369 A | 12/1995 | Abe | 348/169 |
| 5,629,988 A | 5/1997 | Burt et al. | 382/276 |
| 5,754,225 A | 5/1998 | Naganuma | 348/155 |
| 5,798,787 A | 8/1998 | Yamaguchi et al. | 348/152 |
| 5,872,858 A * | 2/1999 | Kamada et al. | 382/107 |
| 6,061,055 A * | 5/2000 | Marks | 382/276 |
| 6,263,088 B1 * | 7/2001 | Crabtree et al. | 382/103 |
| 6,314,209 B1 * | 11/2001 | Kweon et al. | 382/243 |
| 6,335,985 B1 * | 1/2002 | Sambonsugi et al. | 382/190 |
| 6,351,492 B1 * | 2/2002 | Kim | 375/240.08 |
| 6,445,409 B1 * | 9/2002 | Ito et al. | 348/155 |
| 6,545,705 B1 * | 4/2003 | Sigel et al. | 348/157 |

* cited by examiner

*Primary Examiner*—Gims Philippe
(74) *Attorney, Agent, or Firm*—Dean D. Small; The Small Patent Law Group (57) ABSTRACT

A video image data reduction system through the use of object tracking reduces information in a video signal having a having a plurality of frames received from a motion video camera with a field of view. Moving objects in the field of view of the motion video camera are detected. These objects are selected if they are of interest. This is determined either by comparison of the detected object against predetermined characteristics of objects of interest or by manual user selection. A data set for each frame of the plurality of frames in the video signal is created based on the selected moving objects. If a frame contains no selected objects then the data set for that frame is marked as empty.

28 Claims, 4 Drawing Sheets

METHOD AND APPARATUS FOR OBJECT TRACKING AND DETECTION

CROSS REFERENCE TO RELATED APPLICATIONS

This application claims the benefit of U.S. provisional patent application Ser. No. 60/188,171 filed on Mar. 10, 2000. United States Patent applications, also claiming the benefit of U.S. Provisional application No. 60/188,171, and entitled "Method and Apparatus for Video Surveillance With Defined Zones" and "Method and Apparatus for Object Surveillance with a Movable Camera" were filed concurrently herewith.

FIELD OF THE INVENTION

The present invention relates to a method and system for reducing the amount of data produced by a video camera.

BACKGROUND OF THE INVENTION

There are several shortcomings in current video surveillance systems that need to be overcome for widespread use of automatic detection and collection of relevant video data in response to scene stimulus without the need of a human operator present. When viewing a scene from a video camera a large amount of data is generated. The vast amount of data created produces a data reduction problem. Automatically detecting and accurately and reliably collecting image information of a moving object using a motion video camera is a difficult task. This task is made even more difficult when trying to detect, track and maintain camera line-of-sight using a single motion video camera without requiring human intervention.

U.S. Pat. No. 5,473,369 (Abe) describes the use of a camera to detect and track a moving object without using conventional block matching. In the system described in Abe single object tracking is performed only after an object is placed within a frame on a screen; however, there is no user input device for manual target selection. This increases error and inaccuracy as it is sometimes difficult to properly discriminate the object from other objects or distracters within a video signal. Moreover, Abe does not provide for camera movement to maintain line-of-site.

Other prior art solutions provide for image stabilization for a camera in arbitrary motion without object tracking functionality. U.S. Pat. No. 5,629,988 (Burt) teaches electronic stabilization of a sequence of images with respect to one another but provides no tracking facility.

Still other prior art solutions control camera movement to maintain line-of-sight between camera and object but lack arbitrary motion compensation or do not provide for automatic and user selected object tracking. U.S. Pat. No. 5,434,621 (Yu) teaches a method for automatic zooming and automatic tracking of an object using a zoom lens but does not provide for reorienting the camera's line-of-sight.

SUMMARY OF THE INVENTION

It is an object of the present invention to provide a motion video tracking filter for use in data reduction.

It is an object of the present invention to provide a method for automated search and collection of motion video data of objects.

It is an object of the present invention to provide a method for improving motion video object tracking performance with user input.

According to one aspect of the present invention there is provided a method for detecting a moving object of interest, having a characteristic with a predetermined value, in a field of view of a motion video camera using a video signal received from the motion video camera, said method comprising the steps of: receiving an object qualifying parameter representative of the characteristic with the predetermined value of the moving object of interest; detecting moving objects to determine the value of the characteristic of the moving object of interest for each detected moving object; determining if a value of the characteristic for each detected moving object is within a predefined tolerance of the predetermined value of the moving object of interest; and generating an indication of detected moving objects having the value of the characteristic within the predefined tolerance.

According to another aspect of the present invention there is provided a method for reducing information in a video signal having a plurality of frames received from a motion video camera with a field of view, wherein each of said frames has a data set, said method comprising: detecting moving objects in the field of view of the motion video camera; selecting objects of interest from said detected moving objects; and creating a data set for each frame of the plurality of frames in the video signal based on detected moving objects.

According to a further aspect of the present invention there is provided a computer readable medium having stored thereon computer-executable instructions for detecting a moving object of interest, having a characteristic with a predetermined value, in a field of view of a motion video camera using a video signal received from the motion video camera performing the steps of: receiving an object qualifying parameter representative of the characteristic with the predetermined value of the moving object of interest; detecting moving objects to determine the value of the characteristic of the moving object of interest for each detected moving object; determining if a value of the characteristic for each detected moving object is within a predefined tolerance of the predetermined value of the moving object of interest; and generating an indication of detected moving objects having the value of the characteristic within the predefined tolerance.

According to an additional aspect of the present invention there is provided a computer readable medium having stored thereon computer-executable instructions for reducing information in a video signal having a plurality of frames received from a motion video camera with a field of view, wherein each of said frames has a data set, performing the steps of detecting moving objects in the field of view of the motion video camera; selecting objects of interest from said detected moving objects; and creating a data set for each frame of the plurality of frames in the video signal based on detected moving objects.

According to yet another aspect of the present invention there is provided a system for detecting a moving object of interest, having a characteristic with a predetermined value, using a video signal received from a motion video camera representing a field of view of the motion video camera, said system comprising: object detection means for detecting moving objects to determine the value of the characteristic of the moving object of interest for each detected moving object; and a comparator for generating an indication of detected moving objects having the value of the characteristic within a predefined tolerance of the predetermined value of the moving object of interest.

According to a further aspect of the present invention there is provided a system for reducing information in a video signal having a plurality of frames received from a motion video camera having a field of view, wherein each of said frames has a data set, said system comprising: object detection means for detecting moving objects in the field of view of the motion video camera; a selector for determining objects of interest from said detected moving objects; and means for creating a data set for each frame of the plurality of frames in the video signal based on detected moving objects.

DETAILED DESCRIPTION

Motion video data is one of the most useful yet one of the most resource intensive data types. While motion video can provide a large amount of data often only a small portion of this data is relevant to a task being performed. Motion video data needs to be filtered to produce a data set that includes only objects of interest to a user. Such filtering allows processing to be performed only when it is needed, thus, decreasing processing time.

Figure 1:
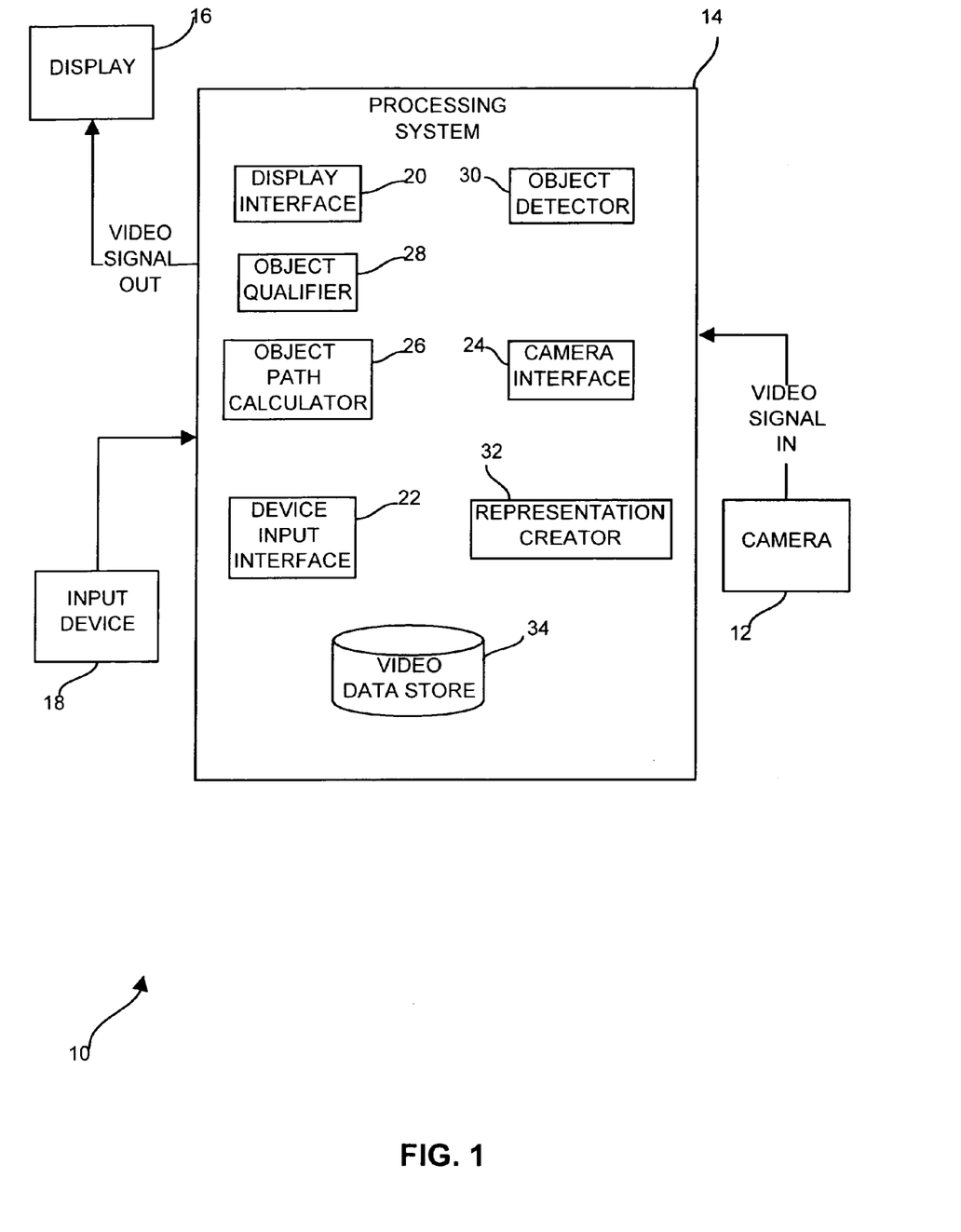
FIG. 1 is a functional diagram of a tracking and detection system according to an embodiment of the present invention.

FIG. 1 shows a system 10 for reducing motion video data to a data set containing only objects of interest. A video camera 12 collects motion video data and sends a motion video signal to a processing system 14. The video signal in received from the video camera 12 is passed to a display 16 as a video signal out.

The video signal out to the display 16 may contain the information exactly as received from the camera 12 or it may be modified to include graphic information used to accept user input from an input device 18, such as a mouse or trackball. The graphic information added to the video signal before display may include results from the processing system 14 or may serve to aid in acquiring user input for subsequent processing.

The processing system 14 reduces a video signal to statistical representations of objects contained in the field of view of the camera 12. The processing performed by the processing system 14 may occur before or after the video signal is displayed or the pure video signal may be displayed during processing. When the processing occurs before the video signal is displayed, the processing system 14 defines objects based on, for example, movement of the object or other qualifiers. If it is desired to form statistical object representations prior to displaying the video signal then the processing system provides a statistical object representation for all objects found in the camera's 12 field of view.

The video signal in is composed of a plurality of individual data frames, each having a large data set associated therewith. The statistical object representations contain information on only those objects that are of interest, whereas the data set for each frame as received from the camera 12 contains information about the entire field of view. The statistical object representations are associated with relevant frames and their data sets to form a reduced data video signal.

Alternatively, the video signal may be displayed after the objects have been defined in a modified form to demarcate the objects. A user may then use the input device 18 to selects an object(s) for which statistical representations will be used to form the reduced data video signal.

The processing of the video signal may also occur after the video signal is initially displayed before display the video signal is modified to provide the user with an aid for determining an area of interest. The user may then select a monitoring area of interest by way of the input device 18 that will be processed in order to detect objects in the selected monitoring area. Statistical object representations may be determined based on all objects in the selected monitoring area. Alternatively, a second modified video signal may be displayed demarcating the detected objects to allow the user to select an object of interest from which the statistical object representations may be created.

The processing system 14 has interfaces 20, 22, 24 to the display 16, the input device 18 and the camera 12. A camera interface 24 receives the video signal in from the camera 12 and passes this signal to an object detector 30 where the process of detecting and tracking an object is performed. A display interface 20 receives the video signal out from the object detector 30, including additional graphic information for representing detected objects, and passes this signal to the display 16. An input device interface 22 receives an input signal from the input device 18 containing information from the user for guiding the tracking and detection process controlled by the object detector 30.

The object detector 30 receives video information from the camera 12 and information from the input device 18. The object detector 30 applies a technique to the received video signal to isolate moving objects. The moving objects that are isolated are considered to be detected objects.

Object detection may be accomplished using any number of methods for image segmentation known in the art. For example, motion detection may be performed by frame differencing sequential pairs of video frames and applying thresholding techniques thereby yielding pixels within the processed image that reflect motion of objects within the field of view of the camera. For fixed field of view implementation, frame differencing of the current video frame against a moving average frame may also be used. Additional image processing techniques such as centroid analysis may then be applied to reduce the effects of spurious motion. Kalman filtering may be applied over time to further reduce the effects of random motion and to estimate motion of the object for the purpose of anticipating camera repositioning and maintaining tracking when moving objects are temporarily occluded by stationary ones. This technique of anticipating motion to move the camera is discussed in greater detail in Applicant's co-pending application titled "Method and Apparatus for Object Surveillance with a Movable Camera" filed concurrently herewith and incorporated herein by reference.

The object detector 30 interfaces with an object qualifier 28 to present object qualifiers, such as size and velocity, through the display interface 20 for selection via the input device interface 22. Qualifiers assist in the determination of which objects detected by the object detector 30 are to be selected for creating statistical object representations. A number of qualifiers are presented to the user for selection (i.e. individual qualifiers are selected to be used) and for setting (i.e. values are assigned to the selected qualifiers). The input device interface 22 provides an indication from a user of a selected qualifier or characteristic of an object and a value for that characteristic representative of an object of interest. The characteristic and value form an object qualifying parameter. Detected objects meeting the qualifiers, or falling within the value range of the selected qualifiers (i.e. determined by percentage error an a predefined tolerance or some other well known comparison technique), are further defined by techniques described below. By creating object representations for only those objects that meet prescreening qualifiers, the number of false object representations created (i.e. objects that are not of interest) can be reduced.

Qualifiers may be based on coordinates in the field of view of the camera 12. For example, size may be determined by selecting an area in the field of view that approximates the size of objects to be detected (i.e. people versus dogs). As the camera 12 presents a perspective of the field of view, two sizes in different areas of the field of view may be selected and those sizes calibrated to provide a changing size qualifier to compensate for the changing size of an object due to the phenomenon of perspective. Qualifiers may also include color profile, size, position, velocity, acceleration, shape, etc.

The velocity and acceleration of an object are determined by an object path calculator 26. After an object has been detected the movement qualifiers of the object are determined. A history of this movement is taken to produce the current track of movement that the object is taking. The information on the position and movement of the detected object is used in the object selection process and the creation of the statistical object representation.

Once the object has been detected and meets the pre-screening qualifier(s) then the object qualifier 28 will determine any remaining possible object qualifier values that will be used to the object representation. Alternatively, a selected subset of the possible qualifiers may calculated for the detected object.

Once the object's movement and qualifiers have been determined a representation creator 32 creates a statistical representation of the object. This object representation is associated with the data set of a frame for reducing the data in the video signal in. The object path calculator 26, the object qualifier 28 and the representation creator 32 all participate in the presentation creation process. The system 14 also includes a video data store 34 for storing the reduced form of the video signal wherein with each frame there is associated a representation of all objects of interest. The data store 34 may be searched to find video information based on the statistical representation on an object.

Figure 2:
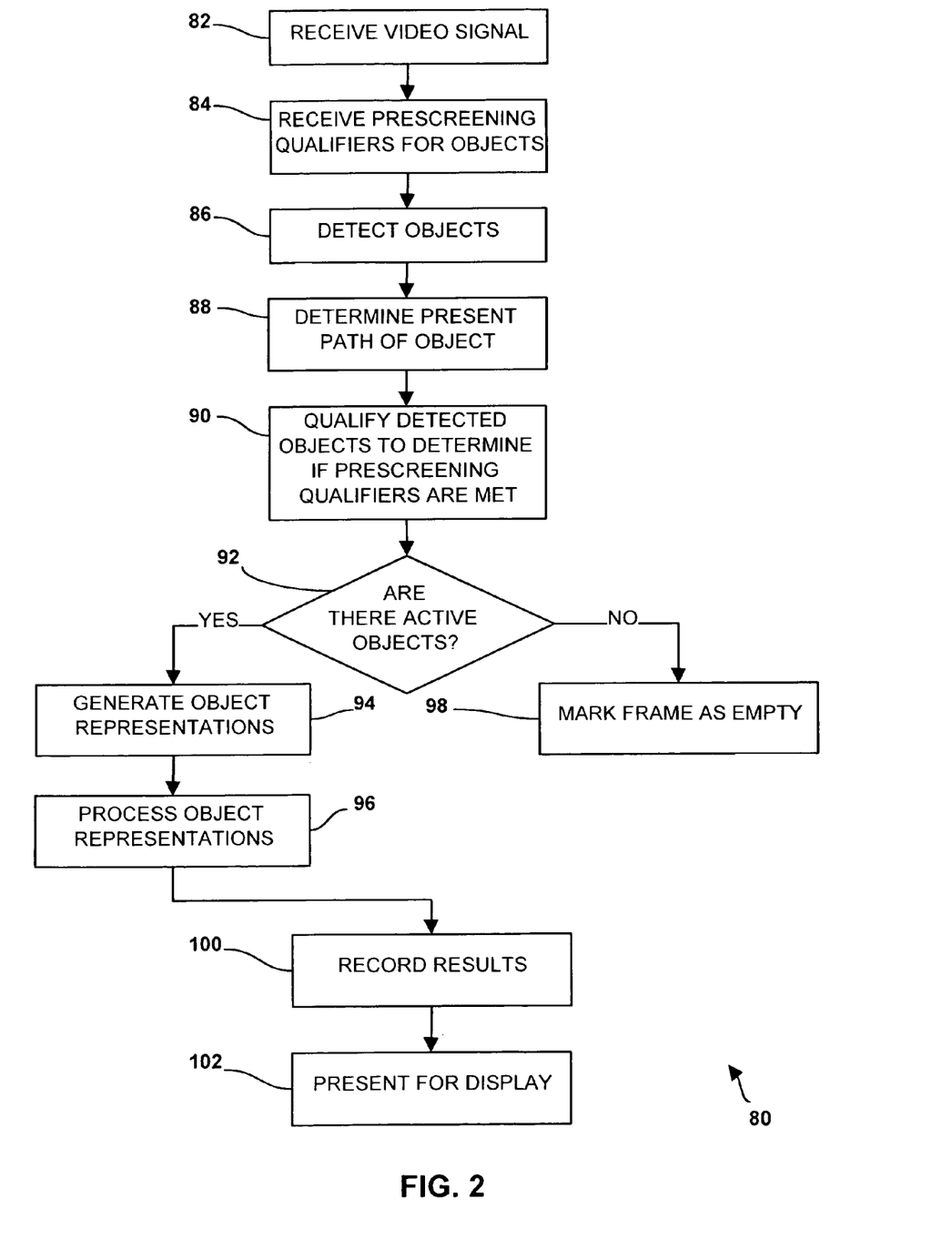
FIG. 2 is a flow chart illustrating a first exemplary tracking and detection method according to an embodiment of the present invention.
Figure 4:
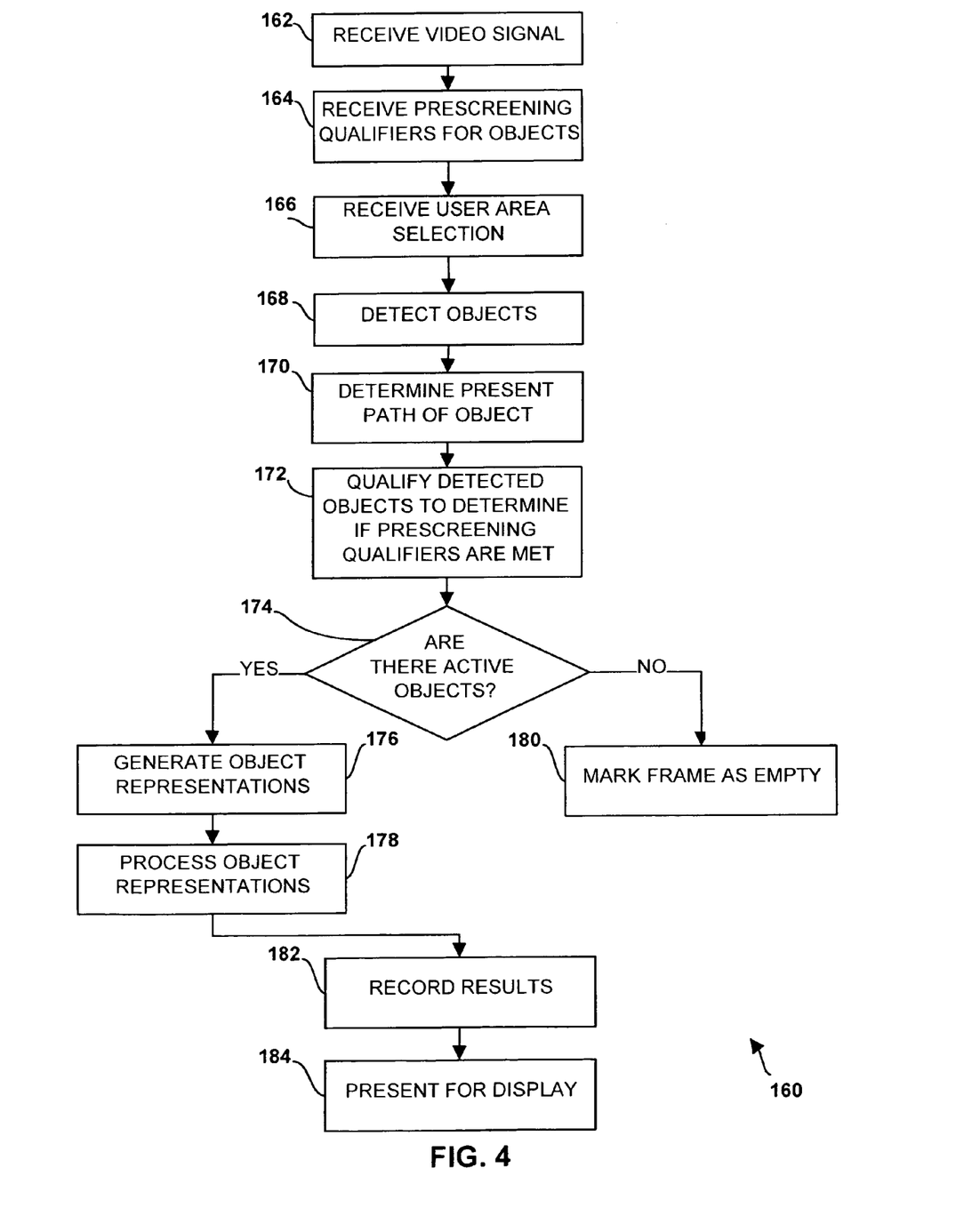
FIG. 4 is a flow chart illustrating a second exemplary tracking and detection method according to an embodiment of the present invention.

FIG. 2 is a flow chart illustrating a tracking and detection method 80 of the processing system 14 where all objects in the camera's 12 field of view are detected and those falling within a predefined tolerance of the predefined qualifiers are selected before generating statistical representations. FIG. 4 describes the case wherein only objects in a predefined area are detected. A video signal is received 82 at the processing system 14. The video signal may be displayed on the display 16 during object detection. A selected list of qualifiers and values for those selected qualifiers are received from the user in step 84. The received selection of qualifiers are used to form a basis for selecting objects from which object representations will be created to represent the video signal. Only those objects matching the received qualifiers are used to create object representations by the processing system 14.

Objects in the field of view are detected by object detection techniques, such as image segmentation, in step 86. These object detections can be based on movement between multiple frames of the video signal. The object detections can also be formed using a single frame by performing image segmentation to detect the edges in an image and then performing a pattern recognition procedure, such as, clustering, to makes object definitions.

The processing system 14 determines the present path of the detected objects in step 88. The detected objects are then qualified in step 90 to determine if these are object of interest based on the received qualifiers. For automatic tracking of detected objects, automatic selection of objects matching the received qualifiers may be used so that only potential objects of interest are selected and other objects ignored. The step of qualifying 90 detected objects includes determining a qualifier value for each detected object and comparing that value with the value of the received qualifier. If the value of the qualifier for the detected object falls within a predetermined tolerance of the received value (i.e. as determined by percentage error, etc.) then the detected object is selected.

The video signal frames are analyzed in step 92 to determine if there are active objects. An active object is one that has been detected, meets the received qualifiers and was therefore automatically selected. If there are no active objects then the current frame is marked as an empty data set in step 98. This allows frames having no useful data to be discarded. If there are objects of interest that are active then the selected object(s) can be reduced to a statistical representation of the selected object(s) in step 94. This allows the data set of a frame to be reduced to only objects of interest that are active.

The statistical representation of an object generated in step 94 includes information from the qualifier values specific to each detected object as well as information on the movement and position of the object as determined in step 90. The statistical representation of each object may include display size (as determined by a bounding box); current, predicted and past position; current, predicted and past velocity; current, predicted and past acceleration, and color. During the determination of the qualifiers in step 90 spatial moments of various types such as pixel intensity, color, shape, etc., may also be derived for use in the statistical representation. Additional attributes may be derived by application of motion video tracking statistics.

The statistical object representations are used for further processing in step 96. This processing may include searching for or storing the video of objects of interest. The statistical representation may also be used for processing alarm conditions. Given a predefined set of alarm condition, the characteristics of the detected object(s) (i.e. the qualifiers, position and movement) are used to detect the presence of an alarm condition. For example, it may not be desirable to have any detected objects in a certain area of the field of view. Statistical object representation can be compared to alarm condition definitions to quickly assess if any of the object characteristics fall in an alarm condition definition.

After a frame has been marked as empty 98 or the object representations have been processed 96, then the results are recorded 100 and presented for display 102.

Figure 3:
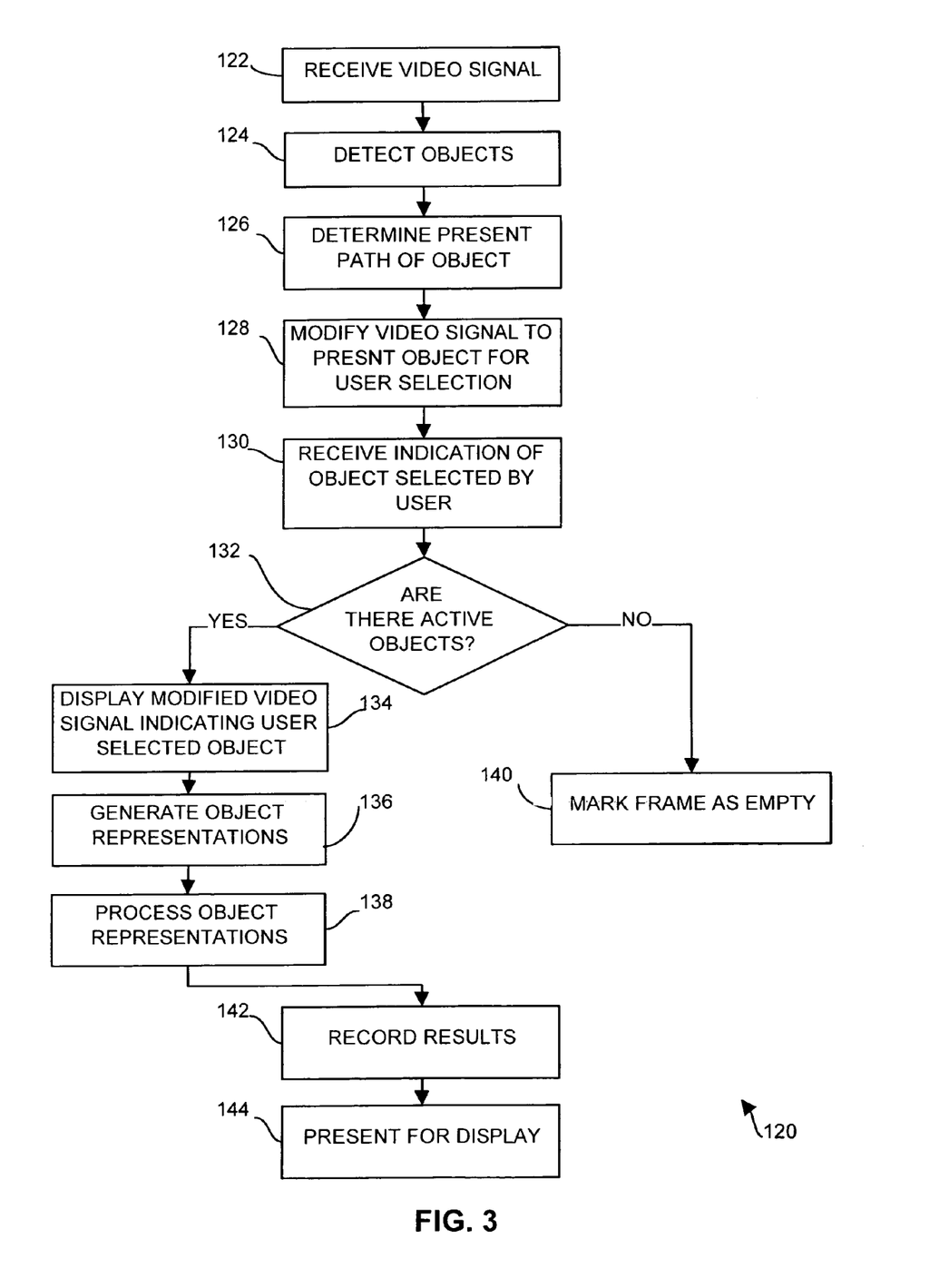
FIG. 3 is a flow chart illustrating an automatic tracking method initiated by a user's input.

FIG. 3 is a flow chart illustrating an automatic detection and tracking method responsive to user input. A video signal is received in step 122 from the camera 12. All objects in the field of view of the camera are detected in step 124. The present path of these detected objects is determined in step 126. The video signal received in step 122 is modified to present detected object(s) for user selection in step 128. An indication of selected object(s) is received from the user in step 130. If there have been none of the detected object(s)

132 were selected in step 130 then the current frame of video is marked as empty 140. If there were detected object(s) that were selected then the video signal is modified to indicate the user selected object(s) 134. Object representations are generated 136 and processed for the selected detected object (s) 138. The results of the processing of object representations 138 or empty frame marking 140 are recorded 142 and presented for display 144.

FIG. 4 is a flow chart illustrating a tracking and detection method 160 of the processing system 14 where only objects falling within a predefined area of the camera's 12 field of view are detected. A video signal is received 162 at the processing system 14. A selected list of qualifiers and values for these selected qualifiers are received from the user in step 164. A selected area in the field of view in which object detection is to take place is received from the user in step 166. The selected area may be a zone from a plurality of zones having different associated action defined in the field of view. The process of defining zones is described in Applicant's co-pending application titled "Method and Apparatus for Video Surveillance With Defined Zones," filed concurrently herewith and incorporated herein by reference. The received selection of qualifiers and monitoring area are used to form a basis for selecting objects from which object representations will be created to represent the video signal. Only those objects located in the monitoring area matching the received qualifiers are defined by the processing system 14. Objects in the selected area are detected by known object detection techniques in step 168.

The processing system 14 determines the present path of the detected objects in step 170. The detected objects are then qualified in step 172 to determine if these are object of interest based on the received qualifier(s). Any object meeting the received qualifiers is automatically selected for further processing in steps 174 to 184.

The video signal frames are analyzed in step 174 to determine if there are active objects. If there are no active objects then the current frame is marked as an empty data set in step 180. This allows frames having no data of interest to be discarded. If there are objects of interest that are active then the object definition and the present track of the selected object(s) can be reduced to a statistical representation of the selected object(s) in step 176. This allows the video signal to be reduced to objects of interest that are active.

The statistical object representations are used for further processing in step 178. After a frame has been marked as empty 180 or the object representations have been processed, then the results are recorded 182 and presented for display 184.

It is apparent to one skilled in the art that numerous modifications and departures from the specific embodiments described herein may be made without departing from the spirit and scope of the invention.

The invention claimed is:

1. A method for detecting a moving object of interest, having a characteristic with a predetermined value, in a field of view of a motion video camera using a video signal received from the motion video camera, said method comprising the steps of:
   receiving an object qualifying parameter representative of the characteristic with the predetermined value of the moving object of interest;
   receiving an indication of a selected monitoring area in said field of view;
   detecting moving objects within said selected monitoring area to determine the value of the characteristic of the moving object of interest for each detected moving object;
   determining if a value of the characteristic for each detected moving object is within a predefined tolerance of the predetermined value of the moving object of interest; and
   generating an indication of detected moving objects having the value of the characteristic within the predefined tolerance.

2. The method of claim 1 wherein said object detection parameter is selected from the group consisting of color, velocity, position, acceleration, and size.

3. A method for reducing information in a video signal having a plurality of frames received from a motion video camera with a field of view, wherein each of said frames has a data set, said method comprising:
   receiving an indication of a selected monitoring area in said field of view;
   detecting moving objects in the selected monitoring area of the field of view of the motion video camera;
   selecting objects of interest from said detected moving objects; and
   creating a data set for each frame of the plurality of frames in the video signal based on detected moving objects.

4. The method of claim 3 further including the steps of:
   receiving an object qualifying parameter representative of a characteristic of a predetermined value of a moving object of interest;
   determining the value of the characteristic of the moving object of interest for each object of interest;
   determining if a value of the characteristic for each detected moving object is within a predefined tolerance of the predetermined value of the moving object of interest; and
   wherein the step of selecting includes the step of automatically selecting detected moving objects having the value of the characteristic within the predefined tolerance.

5. The method of claim 3 wherein the step of selecting object of definitions includes receiving an indication of at least one selected object of interest.

6. The method of claim 3 wherein the step of creating said data set includes the steps of:
   determining if a current frame of the plurality of frames contains at least one selected object of interest;
   if said current frame contains at least one selected object of interest, generating a data representation of said at least one selected object of interest and associating said data representation with said data set of said current frame; and
   if said current frame does not contain at least one selected object of interest, marking said data set for said current frame as empty.

7. The method of claim 3 wherein said object detection parameter is selected from the group consisting of color, velocity, position, acceleration, and size.

8. The method of claim 3 wherein the step of creating a data set includes the steps of:
   determining a present position and velocity of each selected object of interest; and
   predicting a future position of each selected object of interest based on said present position and velocity.

9. A computer readable medium having stored thereon computer-executable instructions for detecting a moving object of interest, having a characteristic with a predetermined value, in a field of view of a motion video camera using a video signal received from the motion video camera performing the steps of:

receiving from a user an object qualifying parameter representative of the characteristic with the predetermined value of the moving object of interest;

detecting moving objects to determine the value of the characteristic of the moving object of interest for each detected moving object;

determining if a value of the characteristic for each detected moving object is within a predefined tolerance of the predetermined value of the moving object of interest; and generating an indication of detected moving objects having the value of the characteristic with the predefined tolerance.

10. The computer readable medium of claim 9 further including the step of receiving an indication of a selected monitoring area in said field of view and wherein said step of detecting is performed in said monitoring area.

11. The computer readable medium of claim 9 wherein said object detection parameter is selected from the group consisting of color, velocity, position, acceleration, and size.

12. A computer readable medium having stored thereon computer-executable instructions for reducing information in a video signal having a plurality of frames received from a motion video camera with a field of view, wherein each of said frames has a data set, performing the steps of detecting moving objects in the field of view of the motion video camera;

receiving a user selection of objects of interest from said detected moving objects; and creating a data set for each frame of the plurality of frames in the video signal base on detected moving objects.

13. A computer readable medium having stored thereon computer-executable instructions for reducing information in a video signal having a plurality of frames received from a motion video camera with a field of view, wherein each of said frames has a data set, performing the steps of detecting moving objects in the field of view of the motion video camera;

selecting objects of interest from said detected moving objects; and creating a data set for each frame of the plurality of frames in the video signal based on detected moving objects by determining if a current frame of the plurality of frames contains at least one selected object of interest; and if said current frame contains at least one selected object of interest, generating a data representation of said at least one selected object of interest and associating said data representation with said data set of said current frame; and if said current frame does not contain at least one selected object of interest, marking said data set for said current frame as empty.

14. The computer readable medium of claim 13 further including the steps of:

receiving an object qualifying a parameter representative of a characteristic of a predetermined value of a moving object of interest, wherein detected moving objects have the characteristic of the moving object of interest;

determining if a value of the characteristic for each detected moving object is within a predefined tolerance of the predetermined value of the moving object of interest; and wherein the step of selecting includes the step of automatically selecting detected moving objects having the value of the characteristic within the predefined tolerance.

15. The computer readable medium of claim 13 wherein the step of selecting object definitions includes receiving an indications of at least one selected object of interest.

16. The computer readable medium of claim 13 wherein the step of creating said data set includes the steps of:

determining if a current frame of the plurality of frames contains at least one selected object of interest;

if said current frame contains at least one selected object of interest, generating a data representation of said at least one selected object of interest and associating said data representation with said data set of said current frame; and if said current frames does not contain at least one selected object of interest, marking said data set for said current frame as empty.

17. The computer readable medium of claim 13 wherein said object detection parameter is selected from the group consisting of color, velocity, position, acceleration, and size.

18. The computer readable medium of claim 13 further including the step of receiving an indication of a selected monitoring area in said field of view; and wherein said step of detecting is performed in said monitoring area.

19. The computer readable medium of claim 13 wherein the step of creating a data set includes the steps of:

determining a present position and velocity of each selected object of interest; and predicting a future position of each selected object of interest based on said present position and velocity.

20. A system for detecting a moving object of interest, having a characteristic with a predetermined value, using a video signal received from a motion video camera representing a field of view of the motion video camera, said system comprising:

an input device for receiving from a user an object qualifying parameter representative of the characteristic with the predetermined value of the moving object of interest;

object detection means for detecting moving objects to determine the value of the characteristic of the moving object of interest for each detected moving object; and a comparator for generating an indication of detected moving objects having the value of the characteristic within a predefined tolerance of the predetermined value of the moving object of interest.

21. The system of claim 20 wherein said object detection means includes means for receiving an indication of a selected monitoring area in said selected monitoring area in said field of view in which object detection is to be performed.

22. A system for reducing information in a video signal having a plurality of frames received from a motion video camera having a field of view, wherein each of said frames has a data set, said system comprising:

object detection means for detecting moving objects in the field of view of the motion video camera, wherein said object detection means includes means for receiving an indication of a selected monitoring area in said field of view in which object detection is to be performed;

a selector for determining objects of interest from said detected moving objects; and means for creating a data set for each frame of the plurality of frames in the video signal based on detected moving objects.

23. The system of claim 22 further including:
a comparator for receiving an object qualifying parameter representative of a characteristic of a predetermined value of a moving object of interest and generating an indication of detected moving objects having the value of the characteristic within a predefined tolerance of the predetermined value of the moving object of interest, wherein said selector includes means for automatically selecting detected moving objects indicated by output of said comparator.

24. The system of claim 22 wherein said means for creating further includes:
a path detector for predicting a future position of each selected moving object based on determined present position and velocity.

25. A method for reducing information in a video signal having a plurality of frames received from a motion video camera with a field of view, wherein each of said frames has a data set, said method comprising:
detecting moving objects in the field of view of the motion video camera;
selecting objects of interest from said detected moving objects; and
creating a data set for each frame of the plurality of frames in the video signal based on detected moving objects by determining if a current frame of the plurality of frames contains at least one selected object of interest; and
if said current frame contains at least one selected object of interest, generating a data representation of said at least one selected object of interest and associating said data representation with said data set of said current frame; and
if said current frame does not contain at least one selected object of interest, marking said data set for said current frame as empty.

26. A method in accordance with claim 25 wherein said data representation comprises a statistical representation.

27. A method in accordance with claim 26 wherein said statistical representation is based at least in part on a qualifier value specific to each selected object of interest and movement and position information.

28. A method in accordance with claim 26 wherein said statistical representation comprises at least one of (i) a display size as determined by a bounding box, (ii) current, predicted and past position information (iii) current, predicted and past velocity information, (iv) current predicted and past acceleration information, and (v) color.

* * * * *